United States Patent
Hamilton

(12) United States Patent (10) Patent No.: US 7,254,576 B1
Hamilton (45) Date of Patent: Aug. 7, 2007

(54) SYSTEM AND METHOD FOR LOCATING AND PRESENTING ELECTRONIC DOCUMENTS TO A USER

(75) Inventor: Nicole Ashley Hamilton, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 452 days.

(21) Appl. No.: 10/847,598

(22) Filed: May 17, 2004

(51) Int. Cl.
*G06F 17/30* (2006.01)

(52) U.S. Cl. ............... 707/6; 707/3; 707/7; 707/10

(58) Field of Classification Search ........... 707/1–3, 707/6, 10, 7
See application file for complete search history.

(56) References Cited

U.S. PATENT DOCUMENTS

| | | | | |
|---|---|---|---|---|
| 5,983,221 A | * | 11/1999 | Christy | 707/5 |
| 6,012,053 A | * | 1/2000 | Pant et al. | 707/3 |
| 6,460,029 B1 | | 10/2002 | Fries et al. | 707/3 |
| 6,523,021 B1 | | 2/2003 | Monberg et al. | 707/2 |
| 6,549,897 B1 | | 4/2003 | Katariya et al. | 707/5 |
| 6,766,320 B1 | | 7/2004 | Wang et al. | 707/5 |
| 2002/0031269 A1 | * | 3/2002 | Fukushima | 382/228 |

* cited by examiner

*Primary Examiner*—Uyen Le
(74) *Attorney, Agent, or Firm*—Shook, Hardy & Bacon, LLP

(57) ABSTRACT

A system and a method for locating and presenting electronic documents most-likely of interest to the user. A plurality of search terms to be located in a set of electronic document is received. One of the search terms is selected as the anchor term, and occurrences of the anchor term are located within the documents. For each located occurrence of the anchor term, a set of search term occurrences is selected. These sets include an occurrence of each search term, and the occurrences are selected by choosing the search term occurrences that are closest to a desired placement for the search terms. With each set of search terms, the method associates a value indicating the extent to which the selected occurrences vary from the desired placement. The electronic documents are ranked and presented to the user in accordance with this value. The invention further includes systems and methods for locating and presenting Web pages and for searching the Internet.

40 Claims, 5 Drawing Sheets

SYSTEM AND METHOD FOR LOCATING AND PRESENTING ELECTRONIC DOCUMENTS TO A USER

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present invention relates to a computer system. More particularly, the present invention provides a system and method for locating and presenting electronic documents that are most likely of interest to a user.

BACKGROUND OF THE INVENTION

In recent years, computer users have become more and more reliant upon computers to store and present a wide range of content including news, research, and entertainment. For example, the Internet, through its billions of Web pages, provides a vast and quickly growing library of information and resources.

In order to find desired content, computer users often make use of search utilities. For example, Internet search engines are well known in the art, and commonly known commercial engines include those provided by Google, Yahoo, and Microsoft Network (MSN). In response to a user's search query, an Internet search engine will generally provide a listing of various Web pages that may contain desired content.

Many of today's commercial search engines rely on some common techniques to provide search results. An Internet search engine generally has a substantial database in which content from billions of Web pages is stored and indexed. To gather this Web page data, a utility known as a "Web crawler" scours the Internet and pulls in text and data from known Web sites.

After the Web crawler relays the content of a Web page to the database, the text is parsed and various indices are created. These indices catalog the location of various occurrences of each word on the stored Web pages. An Internet search engine can then utilize the indices to find Web pages that contain desired search terms.

However, often a user's search will yield thousands, if not millions, of "hits," Web pages containing each of the search terms. Accordingly, providers of search engines are tasked with the challenge of scoring or ranking the various hits. Optimally the scoring/ranking will predict which of the pages will be most useful to the user. It should be noted that any commercially viable search engine must make this ranking determination very quickly so as not to delay the presentation of hits to the user. Because of time constraints, generally, search engine algorithms may perform only one pass through a hit when making scoring/ranking determinations.

Currently available search engines, however, are limited in that they do not strongly consider certain aspects of a document and/or of a user's query when making ranking decisions. For example, conventional search engines do not effectively consider word placement and word order within a user's query when ranking documents. By not given ample weight to word placement and order, conventional search engines often fail to locate exact or near exact phrase matches in a document. This failure may cause highly relevant documents to receive a diminished ranking and to be excluded from presentation to a user. Accordingly, there is a need for an improved search engine that quickly and efficiently scores/ranks search results to find the hits that are most likely to contain content of interest to a user.

SUMMARY OF THE INVENTION

The present invention meets the above needs and overcomes one or more deficiencies in the prior art by providing a system and method for locating and presenting electronic documents that are most likely of interest to a user. In one aspect of the present invention, a computer-implemented method is provided which receives a plurality of search terms to be located in a set of electronic documents. One of the search terms is selected as the anchor term, and occurrences of the anchor term are located within the documents. For each located occurrence of the anchor term, a set of search term occurrences is selected. These sets include an occurrence of each search term, and the occurrences are selected by choosing the search term occurrences that are closest to a desired placement for the search terms. With each set of search terms the method associates a value indicating the extent to which the selected occurrences vary from the desired placement. The electronic documents are ranked and presented to the user in accordance with this value.

Another aspect of the present invention includes a computer-readable media having computer-useable instructions for performing a method for locating and presenting electronic documents that are most likely of interest to a user. Search terms are received, and documents that contain at least one occurrence of each of the search terms are identified. One of the search terms is selected as an anchor term, and placement information is associated with each non-anchor search term. This placement information indicates a desired placement for the non-anchor search terms in relation to the anchor term. Occurrences of the anchor term are located in the identified documents, and, for each located occurrence, a set of search terms having an occurrence of each of the search terms is produced. These occurrences are selected by choosing the occurrences of the search terms that are closest to the desired placement relative to the located anchor term occurrences. A value indicating variation between the selected occurrences and the desired placement is associated with each set of search terms, and this value is utilized to present the user with the electronic documents with minimum variation from the desired placement for the search terms.

Yet another aspect of the present invention includes a computerized method for locating and presenting Web pages most-likely of interest to a user. Search terms are received, and Web pages that contain an occurrence of each of these search terms are identified. Sets of search terms are found, and these sets are ranked according to the variation between the location of the search term occurrences and the placement of the search terms as received by the method.

A further aspect of the present invention includes a computerized method for providing an Internet search engine that presents a listing of Web pages having content of likely interest to a user. A search phrase made up of a plurality of search terms is received, and Web pages that contain an occurrence of each of these search terms are identified. Sets of search terms having an occurrence of each of the search terms are found within the Web pages. These sets are then ranked according to the variation between the location of the search term occurrences in the Web page and the location of the search terms in the search phrase. A listing of Web pages having sets of search terms with minimum variation from the search phrase is presented to the user.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

The subject matter of the present invention is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein and wherein.

The present invention provides an improved system and method for presenting electronic documents most likely of interest to a user. An exemplary operating environment for the present invention is described below.

Figure 1:
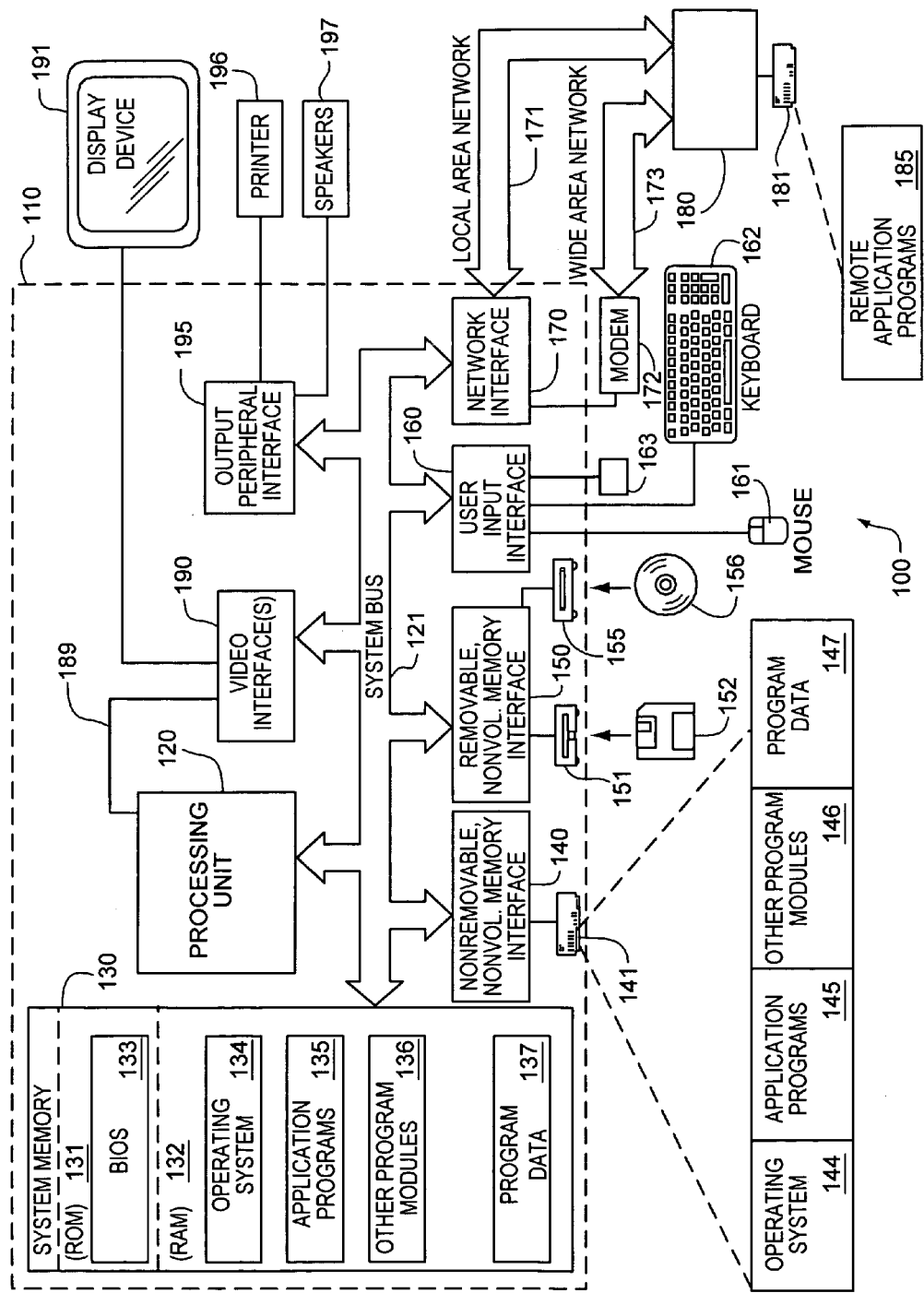
FIG. 1 is a block diagram of a computing system environment suitable for use in implementing the present invention.

Referring to the drawings in general and initially to FIG. 1 in particular, wherein like reference numerals identify like components in the various figures, an exemplary operating environment for implementing the present invention is shown and designated generally as operating environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including handheld devices, multiprocessor systems, microprocessor-based or programmable-consumer electronics, minicomputers, mainframe computers, and the like. The invention may also be practiced in distributed-computing environments where tasks are performed by remote-processing devices that are linked through a communications network. In a distributed-computing environment, program modules may be located in both local and remote computer-storage media including memory storage devices.

With reference to FIG. 1, an exemplary system 100 for implementing the invention includes a general purpose computing device in the form of a computer 110 including a processing unit 120, a system memory 130, and a system bus 121 that couples various system components including the system memory 130 to the processing unit 120.

Computer 110 typically includes a variety of computer-readable media. By way of example, and not limitation, computer-readable media may comprise computer-storage media and communication media. Examples of computer-storage media include, but are not limited to, Random Access Memory (RAM); Read-Only Memory (ROM); Electronically Erasable Programmable Read-Only Memory (EE-PROM); flash memory or other memory technology; CD-ROM, digital versatile discs (DVD) or other optical or holographic disc storage; magnetic cassettes, magnetic tape, magnetic disk storage or other magnetic storage devices; or any other medium that can be used to store desired information and be accessed by computer 110. The system memory 130 includes computer-storage media in the form of volatile and/or nonvolatile memory such as ROM 131 and RAM 132. A Basic Input/Output System 133 (BIOS), containing the basic routines that help to transfer information between elements within computer 110 (such as during start-up) is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/nonremovable, volatile/nonvolatile computer-storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD-ROM or other optical media. Other removable/nonremovable, volatile/nonvolatile computer-storage media that can be used in the exemplary operating environment include, but are not limited to, magnetic tape cassettes, flash memory units, digital versatile disks, digital video tape, solid state RAM, solid state ROM, and the like. The hard disk drive 141 is typically connected to the system bus 121 through a nonremovable memory interface such as interface 140. Magnetic disk drive 151 and optical disc drive 155 are typically connected to the system bus 121 by a removable memory interface, such as interface 150.

The drives and their associated computer-storage media discussed above and illustrated in FIG. 1 provide storage of computer-readable instructions, data structures, program modules and other data for computer 110. For example, hard disk drive 141 is illustrated as storing operating system 144, application programs 145, other program modules 146, and program data 147. Note that these components can either be the same as or different from operating system 134, application programs 135, other program modules 136, and program data 137. Typically, the operating system, application programs and the like that are stored in RAM are portions of the corresponding systems, programs, or data read from hard disk drive 141, the portions varying in size and scope depending on the functions desired. Operating system 144, application programs 145, other program modules 146, and program data 147 are given different numbers here to illustrate that, at a minimum, they can be different copies. A user may enter commands and information into the computer 110 through input devices such as a keyboard 162; pointing device 161, commonly referred to as a mouse, trackball or touch pad; a wireless-input-reception component 163; or a wireless source such as a remote control. Other input devices (not shown) may include a microphone, joystick, game pad, satellite dish, scanner, or the like. These and other input devices are often connected to the processing unit 120 through a user-input interface 160 that is coupled to the system bus 121 but may be connected by other interface and bus structures, such as a parallel port, game port, IEEE 1394 port, or a universal serial bus (USB), or infrared (IR) bus.

A display device 191 is also connected to the system bus 121 via an interface, such as a video interface 190. Display device 191 can be any device to display the output of computer 110 not limited to a monitor, an LCD screen, a Thin Film Transistor (TFT) screen, a flat-panel display, a conventional television, or screen projector. In addition to the display device 191, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local-area network (LAN) 171 and a wide-area network (WAN) 173 but may also include other networks, such as connections to a metropolitan-area network (MAN), intranet, or the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the network interface 170, or other appropriate mechanism. Modem 172 could be a cable modem, DSL modem, or other broadband device. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnections are well-known. For example, including various expansion cards such as television-tuner cards and network-interface cards within a computer 110 is conventional. Accordingly, additional details concerning the internal construction of the computer 110 need not be disclosed in connection with the present invention.

When the computer 110 is turned on or reset, the BIOS 133, which is stored in ROM 131, instructs the processing unit 120 to load the operating system, or necessary portion thereof, from the hard disk drive 141 into the RAM 132. Once the copied portion of the operating system, designated as operating system 144, is loaded into RAM 132, the processing unit 120 executes the operating-system code and causes the visual elements associated with the user interface of the operating system 134 to be displayed on the display device 191. Typically, when an application program 145 is opened by a user, the program code and relevant data are read from the hard disk drive 141 and the necessary portions are copied into RAM 132, the copied portion represented herein by reference numeral 135.

The present invention may be described in the general context of computer-useable instructions. Computer-useable instructions include functions, procedures, schemas, routines, code segments, and modules useable by one or more computers or other devices. The computer-useable instructions form an interface to allow a computer to react according to a source of input. The instructions cooperate with other code segments to initiate a variety of tasks in response to data received in conjunction with the source of the received data.

As previously mentioned, the current invention relates an improved system and method for searching electronic documents. As will be appreciated by those skilled in the art, electronic documents may be any set of content stored on computer readable media. For example, computer items/files such as word processor documents, spreadsheets, or Web pages may be considered electronic documents. Further, any set of text may be considered an electronic document. The electronic documents may be stored in a single database/data store or in multiple locations.

The present invention may be implemented with a search engine capable of searching text. Those skilled in the art will recognize that any number of text searching utilities may make use of the present invention. For example, an Internet search engine or a database search engine may include the present invention.

Figure 2:
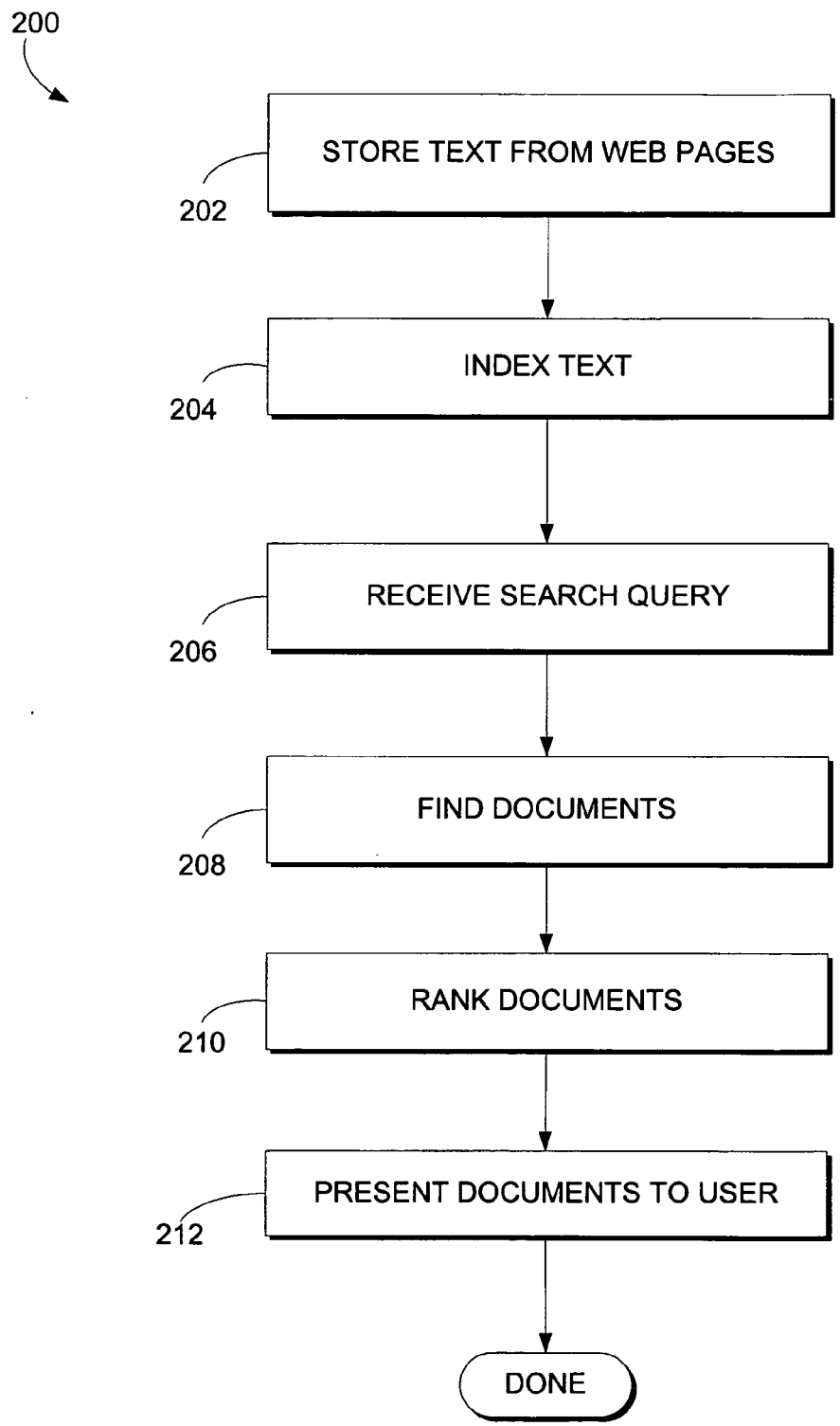
FIG. 2 is a flow diagram showing a method for providing an Internet search engine suitable for use in implementing the present invention.

Internet search engines are well-known in the art and, generally commercially available engines share many similar processes. For example, FIG. 2 shows a method 200 that represents a set of steps that may be performed by an exemplary Internet search engine. Those skilled in the art will recognize that the method 200 provides only one of many possible search engine methods and that numerous search engine methods are acceptable for use with the present invention.

At 202, the method 200 stores text from numerous Web pages in a data store. This data store generally includes a substantial database in which the content from billions of Web pages is stored. As known to those skilled in the art, this content is generally pulled off the Internet by a utility known as a Web crawler, which scours the Internet and relays the text of known Web sites to the data store. The Web crawler may also send additional information about a document to the data store. This information may include title information and where the document may be found (i.e. URL). Web crawlers may be designed to efficiently update the data store by revisiting the known websites. Further, Web crawlers are capable of finding previously unexamined Web pages by following hyperlinks to such pages.

Once the Web crawler has relayed the content of the numerous Web pages to the data store, at 204, the words from the Web pages are indexed. An indexer utility may parse each document, find each word in the document, and build a variety of indexes around the words. For instance, an index may provide a unique location identifier for each word in the database; the first word on the first Web pages may be given the location identifier one, while each subsequent word is consecutively numbered until the last word on the last page is reached. Another index may keep track of the word locations associated with the end of the documents. By considering such an index, it may be determined which words will be found on the same page. Another useful index may be an inverted word index. This index lists each word in the data store and provides the location of each occurrence of a word. Alternately, the index may list the pages on which a word may occur.

At 206, the method 200 receives a query from a user. The query generally will contain at least one or more search terms to be located in the documents. Once the search terms are received, the method 200, at 208, can utilize the indices to find "hits," documents that contain each of the desired search terms. For example, the inverted word index may be considered along with the end-of-document-location index. By utilizing these indices, a list of pages that have an occurrence of a given search term may be produced. After compiling such a list for each search term, a set of pages that are common to each list may be compiled. This set of pages represents the documents that contain occurrences of each of the search terms. As will be understood by those skilled in the art, a variety of index stream readers and constraint solvers may be utilized to consider the indices and to produce the set hits. Such techniques are well-known in the art.

Once the set of hits is established, at 210, the documents are ranked. As set forth herein, a variety of ranking algorithms and techniques may be utilized with the present invention. Optimally, ranking will predict which of the pages will be most useful to the user. At 212, the documents are presented to the user. Such presentation may be according to the rankings—the documents may be presented in order of potential relevance/interest to the user.

Figure 3:
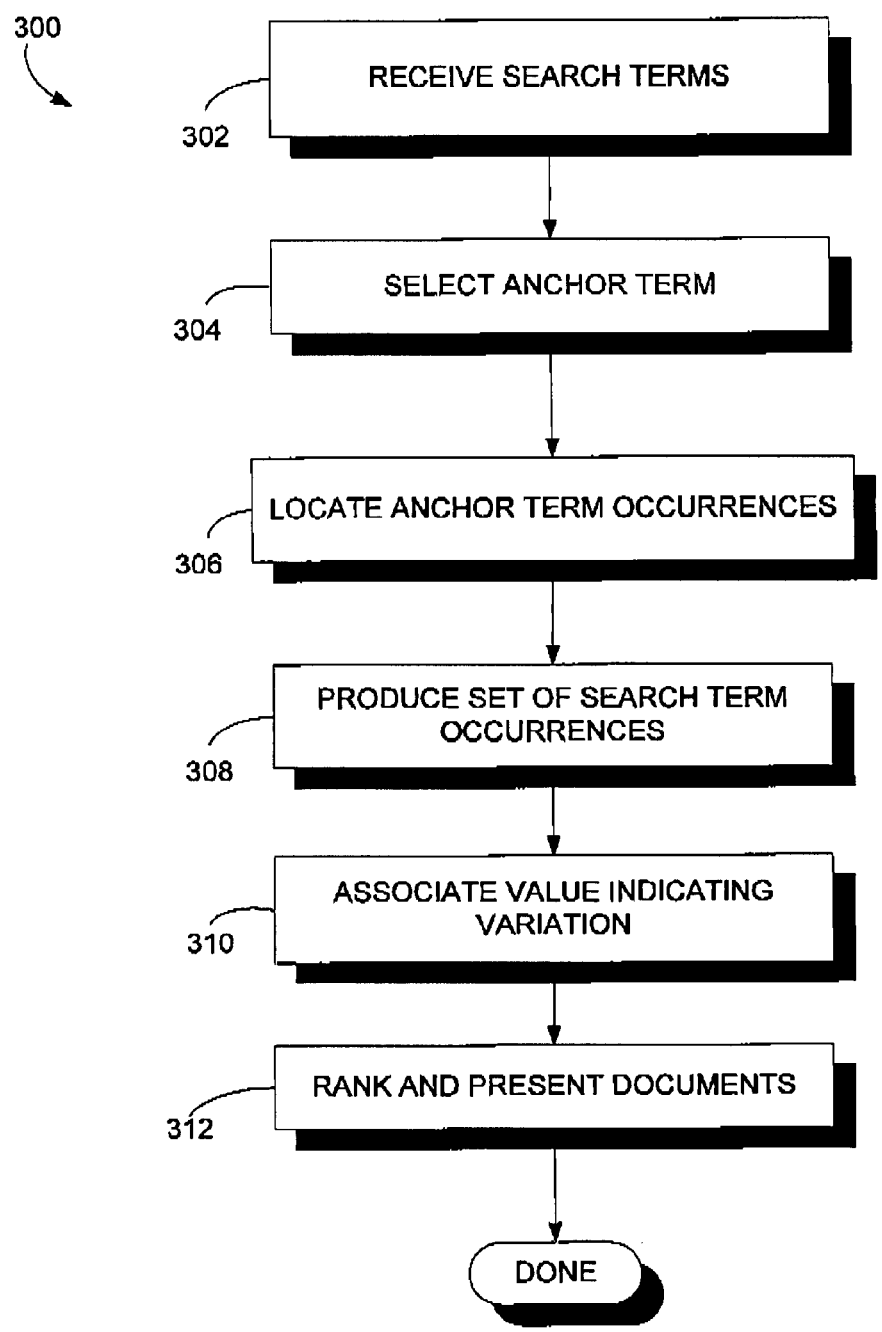
FIG. 3 is a flow diagram showing a method for locating and presenting electronic documents in accordance with an embodiment of the present invention.

FIG. 3 provides a method 300 for locating and presenting electronic documents most-likely of interest to a user. The method may be performed in a variety of environments and may search electronic documents from a variety of locations. For example, the method 300 may present Web page documents from the Internet or electronic documents from a database. Further, the method 300 may be implemented with an Internet search engine similar to the previously discussed Internet search engines.

At 302, the method 300 receives a plurality of search terms to be located in a set of documents. As will be understood by those skilled in the art, any number of search queries having search terms are acceptable for the present invention. Further, any length query or a query also including operators such as Boolean operators may be utilized with the present invention.

At 304, a search term is selected as an anchor term. Any of the search terms may be selected, and, according to one embodiment of the present invention, the method 300 selects the search term that appears in the set of documents the least frequently. As will be explained, by selecting the "rarest" term the efficiently of the method may be maximized.

By selecting the search term with the fewest occurrences, the number of calculations required for the method 300 is reduced and/or minimized. The rarest word may be determined by a variety of methods and techniques aimed at selecting the search term with the fewest occurrences in the documents. For example, the various word indices associated with an Internet search engine may provide data relating to the number of times a word is used on the Web. As will be understood by those skilled in the art, a variety of statistics indicating usage rates for a term may be derived from the previously discussed indices. Those statistics, alone or in combination with other data, may be used to determine which of the search terms is the "rarest." According to one embodiment of the present invention, once deemed the rarest, a search term is selected as the anchor term.

Once a term is selected as the anchor term, at 308, occurrences of the anchor term may be located within the electronic documents. A wide variety of techniques may be utilized to locate these anchor term occurrences. For example, in an Internet search engine, an inverted word index may contain a list of locations for a given term within the stored Web pages. By referencing this index, the method 300 may locate each occurrence of the anchor term. Other search techniques for locating a given term within text are well-known in the art. Optionally, only documents having each of the search terms will be scanned for anchor term occurrences. For example, an Internet search engine may utilize one or more indices to produce a list of pages that have an occurrence of each search term, and only these pages will be considered for potential relevance.

Once an anchor term is located, at 308, the method 300 produces a set of search term occurrences. These sets include an occurrence of each of the search terms. To select these occurrences, a desired placement in relation to the anchor term is considered for each non-anchor search term.

The desired placement may be any relationship defined for placement of the search terms, and the desired placement may be defined by a user or may be implied from a user's query. For example, a specific word order may be used as a desired placement. For instance, a user's search query may read, "bunch of bananas." To determine the desired placement for this query, it may be assumed that the user desires this exact phrase in the order as requested—first word "bunch," followed by "of," and then "bananas." Assuming that "bananas" is the anchor term, the desired placement of "bunch" in relation to the anchor term is two words to the left of the anchor term, and the desired placement of "of" is one word to the left of the anchor term.

The set of search terms is produced by selecting the occurrence of each of the non-anchor search terms that is closest to the desired placement in relation to the located occurrence of the anchor term. Returning to the previous example, if the text being searched read, "bunch of bananas bunch," the first occurrence of bunch would be selected. This is because it is located two words to the left of the anchor term, "bananas"; it occurs exactly at the desired placement. It should be noted that, while the second occurrence of bunch is in closer proximity to the anchor term, this occurrence is disregarded because it is three words away from the desired location. As will be understood by those skilled in the art, by considering a desired placement of the search terms, exact phrase matching becomes more likely.

In order to determine which occurrence of a non-anchor search term should be selected for inclusion in a set of search terms, any number of techniques may be utilized with the present invention. For example, a distance calculation that compares search term occurrences to the desired location may be employed. The occurrence with the minimum distance from the desired location may be included along with the set of search terms for a given anchor term occurrence. Such programming techniques are well-known in the art.

According to one embodiment of the present invention, the sets of search terms are produced with a single pass through a document. The scan starts at the beginning of the document, finds the first occurrence of the anchor term, and produces the corresponding set of search terms associated with the first occurrence. Subsequent occurrences of the anchor term are then located in the order in which they are found in the document. For each anchor term occurrence, the set of search terms is produced before the method proceeds to the next anchor term occurrence. As will be understood by those skilled in the art, the scan moves only forward from one occurrence of the anchor term to the next—scanning only forward and never backwards. By only passing through the document once, the speed and efficiency of the method 300 may be enhanced.

At 310, the method 300 associates with every produced set of search term occurrences a value indicating the variation between the selected occurrences of each non-anchor search term and the desired placement for the terms. As will be understood by those skilled in the art, a wide variety of values that indicate such variation are acceptable for the present invention, and the values may be derived by a variety of formulas. For example, the distance between each selected non-anchor search term occurrence and its desired location may be summed to produce a composite distance variation for the set of search terms.

At 312, the method 300 ranks the electronic documents and presents them to the user in accordance with the rankings. To rank the documents, the values associated with each set of search terms may be considered. In accordance with one embodiment of the present invention, for each document, one set of search terms is selected to represent that document. The selected set of search terms, generally, will be the best match within the document—the set with minimum variation between the occurrences of the search terms and their desired placement. The different documents may then be ranked by consideration of the values associated with these best matches. Documents having closer matches will be ranked higher; such documents may be most-likely of interest to the user. Other ranking metrics and algorithms may be employed to rank the documents, and those skilled in the art will recognize that a wide range of calculations may be utilized.

Once ranked, the documents may be presented to the user in accordance with such rankings. Those skilled in the art will recognize that any number of presentation techniques are acceptable for use with the present invention. For example, the title of the document, the text surrounding the search term occurrences, and/or the document's location/address may be presented to a user. Such presentations are well-known in the art.

Figure 4:
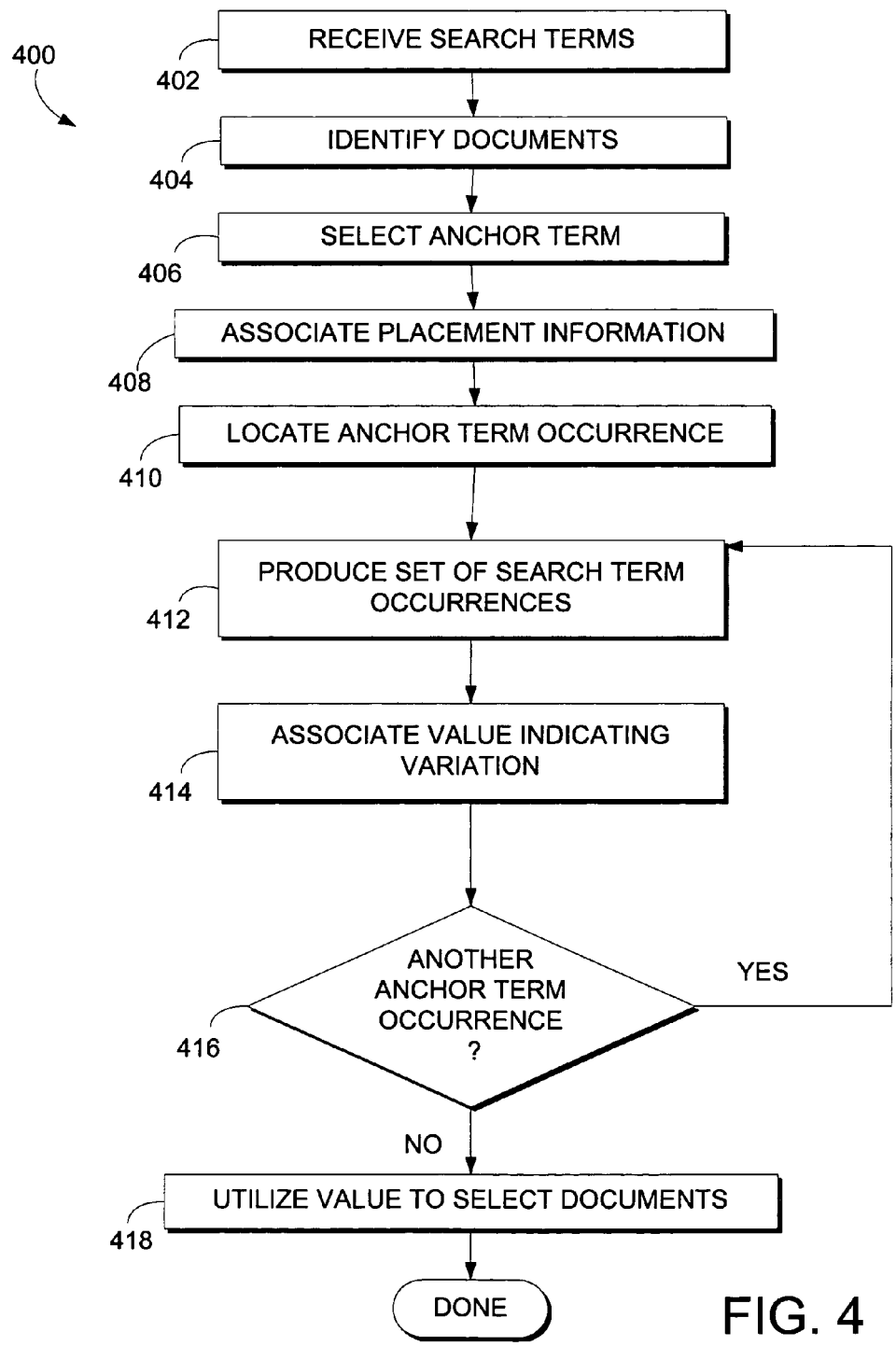
FIG. 4 is a flow diagram showing a method for selecting electronic documents in accordance with an embodiment of the present invention.

FIG. 4 also provides a method 400 for locating and presenting electronic documents most-likely of interest to a user in accordance with the present invention. At 402, one or more search terms are received. Such search terms may represent a user's desire to find electronic documents containing these terms. A wide variety of queries or search requests having search terms may be acceptable for use with the present invention. Also, the present invention may utilize various types of electronic documents. For example, computer items/files such as word processor documents, spreadsheets, or Web pages are acceptable electronic documents. The electronic documents may be stored in a single database/data store or in multiple locations.

At 404, the method 400 identifies documents that contain each of the search terms. Such documents may be located by a variety of methods. As previously discussed, an index may list each word found in the data store's documents, along with the locations of each occurrence of the words. By comparing the locational information associated with the search terms, one may determine which documents contain each of the search terms.

At 406, a search term is selected as an anchor term. Any of the search terms may be selected, and, according to one embodiment of the present invention, the method 400 selects the rarest word as the anchor term. As previously explained, the determination of which word is the rarest may be accomplished by a variety of calculations and techniques.

At 408, placement information is associated with each non-anchor search term. The placement information represents a desired placement of the non-anchor search terms in relation to the anchor term. For example, a desired word order may be used as a desired placement. The desired placement may be defined by a user or may be implied from a user's query. For example, the placement information may indicate that the desired location for a given non-anchor term be so many places to the right or to the left of the anchor term.

At 410, an occurrence of the anchor term is located within one of the identified documents. This location may be made by any number of scanning techniques well known in the art, and, according to one embodiment of the present invention, the first occurrence of the anchor term in the identified document is located initially.

Once an anchor term occurrence is located, at 412, a set of search term occurrences is produced. For each non-anchor search term, the method 400 locates the occurrence of that term which varies the least from the term's desired placement in relation to the anchor term. For example, a search query may read "All day long" and "long" may be selected as the anchor term. It may be desirable for this exact phrase to be located in a document—"all" is desired to be two words to the left of "long" and "day" is desired to be one word to the left of "long." To produce the set of search term occurrences, the method 400 selects the occurrence of "all" and the occurrence of "day" which is closest to the desired placement relative to "long."

At 414, the method 400 associates with every produced set of search term occurrences a value indicating the variation between the selected occurrences of each non-anchor search term and the desired placement for the terms. As previously explained, a wide variety of values indicating such variation are acceptable for the present invention, and the values may be derived by a variety of formulas. For example, with each set of search terms the distance between the selected non-anchor search term occurrences and their desired location may be summed to produce a composite distance variation value for the set.

At 416, a determination is made whether there is another occurrence of the anchor term in the document. For each located anchor term occurrence, steps 412 and 414 are repeated. According to one embodiment of the present invention, each occurrence of the anchor term is located in the order in which it is found in the document. By considering the anchor term occurrences in order, the present invention may be efficiently carried out in a single pass through a document.

At 418, the method 400 utilizes the values indicating variation to select electronic documents that have a set of search terms with minimum variation from the desired placement. In accordance with one embodiment of the present invention, for each document, one set of search terms is selected to represent that document. Generally, the selected set of search terms will be the best match within a document—the set with minimum variation between the selected occurrences of the search terms and their desired placement. One or more documents may then be selected by considering the values associated with these best matches. Such selection may include a ranking process—documents having closer matches will be ranked higher; such documents may be most-likely of interest to the user. Other ranking metrics and algorithms may be employed to rank the documents. Once selected, the documents may be presented to the user.

Figure 5:
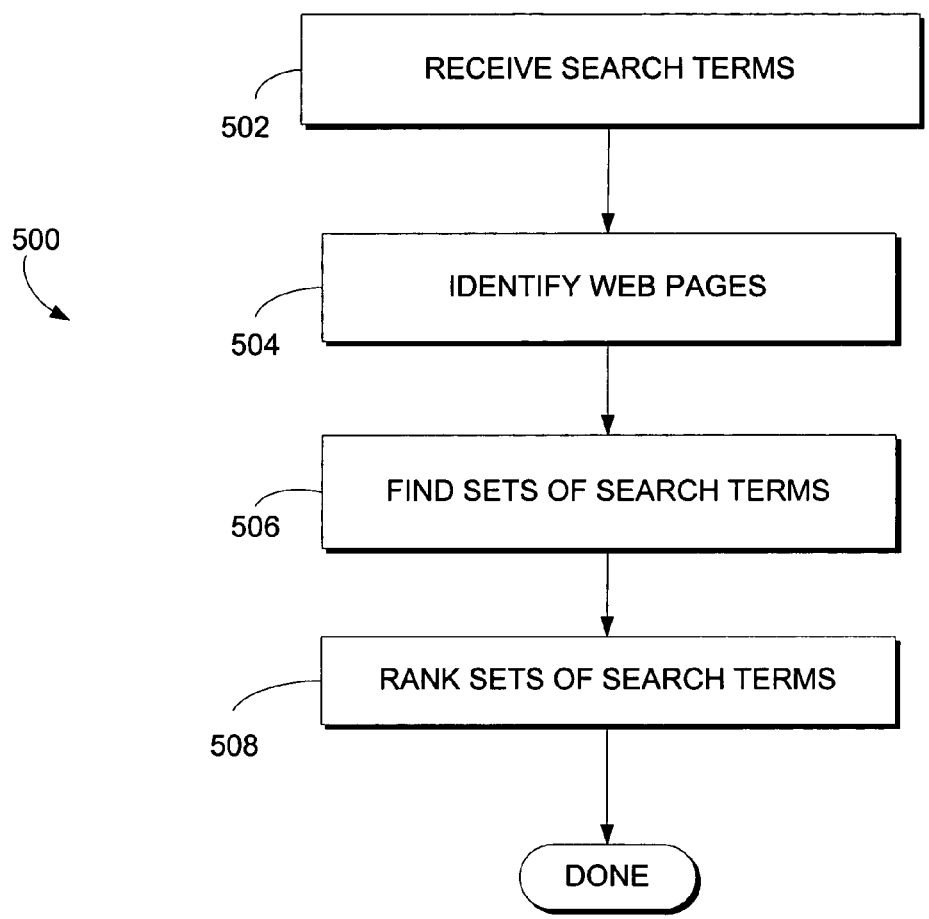
FIG. 5 is a flow diagram showing a method for selecting Web pages in accordance with an embodiment of the present invention.

FIG. 5 presents a method 500 for providing an Internet search engine that locates and presents Web pages most likely of interest to a user in accordance with the present invention. At 502, search terms are received. As will be understood by those skilled in the art, these search terms may be input by a user as part of a query submitted to the Internet search engine. Such queries are well known in the art, and a wide variety of search queries are acceptable for use with the present invention.

The search terms may have a desired placement relative to one another. This desired placement may be expressed as part of the query or implied from aspects of the query. For example, the user may enter a phrase made up of the search terms. It may be implied that the user desires the search terms to be positioned relative to one another as entered in the query.

At 504, the method 500 identifies Web pages that contain at least one occurrence of each of the search terms. Such identification may be accomplished by a variety of well-known techniques in the art. For example, as previously explained, Internet search engines often utilize a substantial data store and indices which track locational information for words found on the Web. By comparing the locational information associated with the search terms, one may determine which Web pages contain each of the search terms.

At 506, sets of search term occurrences are found within the identified Web pages. Each set of search terms includes one occurrence of each of the search terms. The selected search term occurrences may be chosen by a variety of techniques and algorithms. For example, one embodiment of the present invention selects the rarest search term as an anchor term. As previously discussed, the determination of "rarest" may be accomplished by a variety of calculations. For each located occurrence of the anchor term within a Web page, an occurrence of each non-anchor search term is selected to complete the set. The non-anchor search term occurrences may be selected with reference to their desired placement relative to the anchor term. For instance, the occurrence of a non-anchor term which is closest in proximity to its desired placement in relation to a given anchor term may be selected for inclusion in the set of search terms associated with a given anchor term occurrence.

The method 500, at 508, ranks the search terms sets. Such ranking may be accomplished by a variety of means and may endeavor to determine which sets of search terms are most-likely of highest relevance to the user. For example, the sets of search terms may be ranked according to the variation between the search term occurrences selected and the desired placement of the search terms in relation to one another; the closer the set of search terms to the desired placement, the higher the ranking given that set. In one embodiment of the present invention, such a value indicating this proximity is associated with each produced set of search terms. Then, for each Web page, one set of search terms is selected to represent that page. The selected set of search terms should be the best match within that Web page—the set with minimum variation between the occurrences of the search terms and their desired placement. The Web pages may then be ranked by consideration of the values associated with these best matches. Web pages having closer matches will be ranked higher; such documents may be most-likely of interest to the user. Other ranking metrics and algorithms may be employed to rank the documents.

Optionally, once ranked, the documents may be presented to the user in accordance with such rankings. Those skilled in the art will recognize that any number of presentation techniques are acceptable for use with the present invention. For example, the title of the document, the text surrounding the search term occurrences, and/or the document's location/address may be presented to a user.

Alternative embodiments and implementations of the present invention will become apparent to those skilled in the art to which it pertains upon review of the specification, including the drawing figures. Accordingly, the scope of the present invention is defined by the appended claims rather than the foregoing description.

The invention claimed is:

1. A computerized method for locating and presenting to a user electronic documents most-likely of interest to the user, comprising:

receiving search terms to be located in a set of electronic documents, wherein the search terms include at least three terms;

selecting an anchor term from said search terms, wherein the search terms not selected as the anchor term are non-anchor search terms;

locating within at least one of said electronic documents one or more occurrences of said anchor term;

associating with at least one located occurrence of said anchor term a selected occurrence of each of the non-anchor search terms to produce a set of search term occurrences that includes an occurrence of each of said search terms, wherein the choosing of the selected occurrences includes consideration of a desired placement associated with each of the non-anchor search terms;

associating with each of said set of search term occurrences a value indicating a measure of the variation between the selected occurrences of each of the non-anchor search terms and the desired placement of each of the non-anchor search terms; and ranking the electronic documents using said value and presenting the electronic documents to the user according to said ranking.

2. The computerized method of claim 1 wherein said set of electronic documents includes Web pages.

3. The computerized method of claim 1 wherein said set of electronic documents includes data from one or more Web pages.

4. The computerized method of claim 3 wherein said data from one or more Web pages is stored in a data store associated with an Internet search engine.

5. The computerized method of claim 1 wherein said set of electronic documents includes documents stored in one or more databases.

6. The computerized method of claim 1 wherein said method is implemented as part of an Internet search engine.

7. The computerized method of claim 1 wherein selection of the anchor term includes determining which of said search terms occur least frequently within one or more of the electronic documents.

8. The computerized method of claim 1 wherein said anchor term occurrences are located only in documents within said set of documents that contain at least one occurrence of each of the search terms.

9. The computerized method of claim 1 wherein said desired placement includes information indicating a desired order of the search terms.

10. The computerized method of claim 1 wherein said desired placement includes information indicating the number of words between the anchor term and the non-anchor search terms.

11. The computerized method of claim 1 wherein said desired placement is implied from a user's query.

12. The computerized method of claim 1 wherein said desired placement is implied from the order and placement of the search terms in a user's query.

13. The computerized method of claim 1 wherein the locating of the anchor term occurrences within one of the documents and the producing of the sets of search term occurrences associated with the located anchor term occurrences is accomplished by a single scan through the documents containing the located anchor term occurrences.

14. The computerized method of claim 13 wherein said scan proceeds through the document in a single direction.

15. The computerized method of claim 1 wherein producing a set of search term occurrences includes selecting an occurrence of each non-anchor search term which is closest to the desired placement of the non-anchor search term in relation to an occurrence of said anchor term.

16. One or more tangible computer-readable storage media having computer-executable instructions embodied thereon to perform the method of claim 1.

17. One or more tangible computer-readable storage media having computer-executable instructions embodied thereon for performing a method of locating and presenting to a user electronic documents most-likely of interest to the user, the method comprising:
  receiving search terms to be located in a set of electronic documents, wherein the search terms include at least three terms;
  identifying one or more documents within said set of documents that contain at least one occurrence of each of the search terms;
  selecting an anchor term from said search terms, wherein the search terms not selected as the anchor term are non-anchor search terms;
  associating placement information with the non-anchor search terms, wherein said placement information indicates a desired placement for said non-anchor search terms in relation to said anchor term;
  locating within at least one of said identified documents one or more occurrences of said anchor term;
  for each located occurrence of said anchor term, producing a set of search term occurrences by selecting an occurrence of each of the search terms which is closest to the desired placement of the search terms in relation to the located occurrence of said anchor term;
  associating with each of said set of search term occurrences a value indicating a measure of the variation between the selected occurrences of each of the search terms and the desired placement of the search terms; and
  utilizing said value to present to the user one or more electronic documents having search term occurrences with the least variation from the desired placement for the search terms.

18. The computer-readable storage media of claim 17 wherein said set of electronic documents includes documents stored in one or more databases.

19. The computer-readable storage media of claim 17 wherein said set of electronic documents includes data from one or more Web pages.

20. The computer-readable storage media of claim 17 wherein said method is implemented as part of an Internet search engine.

21. The computer-readable storage media of claim 17 wherein selection of the anchor term includes determining which of said search terms occur least frequently within one or more of the electronic documents.

22. The computer-readable storage media of claim 17 wherein said desired placement includes information indicating a desired order of the search terms.

23. The computer-readable storage media of claim 17 wherein said desired placement includes information indicating the number of words between the anchor term and the non-anchor search terms.

24. The computer-readable storage media of claim 17 wherein said desired placement is the order and placement of the search terms as in a user's query.

25. The computer-readable storage media of claim 17 wherein the locating of the anchor term occurrences within one of the documents and the producing of the sets of search term occurrences associated with the located anchor term occurrences is accomplished by a single scan through the identified documents.

26. The computer-readable storage media of claim 25 wherein said scan proceeds through the document in a single direction.

27. A computerized method for locating and presenting to a user Web pages most-likely of interest to the user, comprising:
  receiving a search phrase including search terms to be located in a set of Web pages, wherein said search terms are received in a placement relative to one another, wherein the search terms include at least three terms;
  identifying one or more Web pages from said set of Web pages that contain at least one occurrence of each of the search terms;
  selecting an anchor term from said search terms, wherein the search terms not selected as the anchor term are non-anchor search terms;
  finding one or more sets of search term occurrences within said identified Web pages, wherein said sets have an occurrence of each of the search terms; and
  ranking said identified Web pages according to the variation between the received placement of the search terms relative to one another in the search phrase and the placement of the non-anchor search terms relative to the anchor term in the one or more sets of search term occurrences.

28. The computerized method of claim 27 wherein said Web pages are stored in a data store associated with an Internet search engine.

29. The computerized method of claim 27 wherein finding one or more sets of search term occurrences includes selection of the search term occurrences that have least variation between the location of the selected search term occurrences and the received placement of the search terms relative to one another.

30. The computerized method of claim 27, wherein selection of the anchor term includes determining which of said search terms occur least frequently within the set of Web pages.

31. The computerized method of claim 30 wherein said selection of the anchor term includes, for each located occurrence of said anchor term, selecting the occurrence of each search term which is closest to the received placement of the search terms in relation to the located occurrence of said anchor term.

32. The computerized method of claim 27 wherein finding one or more sets of search term occurrences is accomplished by a single scan through the identified Web pages.

33. The computerized method of claim 32 wherein said scan proceeds through the Web pages in a single direction.

34. One or more tangible computer-readable storage media having computer-executable instructions embodied thereon to perform the method of claim 27.

35. A computerized method for providing an Internet search engine that presents a listing of Web pages having content of likely interest to a user, comprising:

receiving a search phrase having search terms, wherein the search phrase include at least three search terms;

identifying one or more Web pages that contain at least one occurrence of each of the search terms;

finding one or more sets of search term occurrences within said identified Web pages, wherein said sets have an occurrence of each of the search terms;

selecting an anchor term from said search terms, wherein the search terms not selected as the anchor term are non-anchor search terms;

ranking said one or more sets of search term occurrences according to the variation between the location of the search terms relative to one another in the search phrase and the placement of the non-anchor search terms relative to the anchor term in said one or more sets of search term occurrences; and presenting a listing of one or more Web pages in accordance with said ranking.

36. The computerized method of claim 35 wherein selection of the anchor term includes determining which of said search terms occur least frequently within the one or more Web pages.

37. The computerized method of claim 36 wherein said finding one or more sets of search term occurrences includes, for each located occurrence of said anchor term, selecting the occurrences of each non-anchor search term which most closely match the position of the non-anchor search terms in the search phrase.

38. One or more tangible computer-readable storage media having computer-executable instructions embodied thereon to perform the method of claim 36.

39. The computerized method of claim 35 wherein said finding one or more sets of search term occurrences is accomplished by a single scan through the identified Web pages.

40. The computerized method of claim 39 wherein said scan proceeds through the Web pages in a single direction.

* * * * *